UNITED STATES PATENT OFFICE.

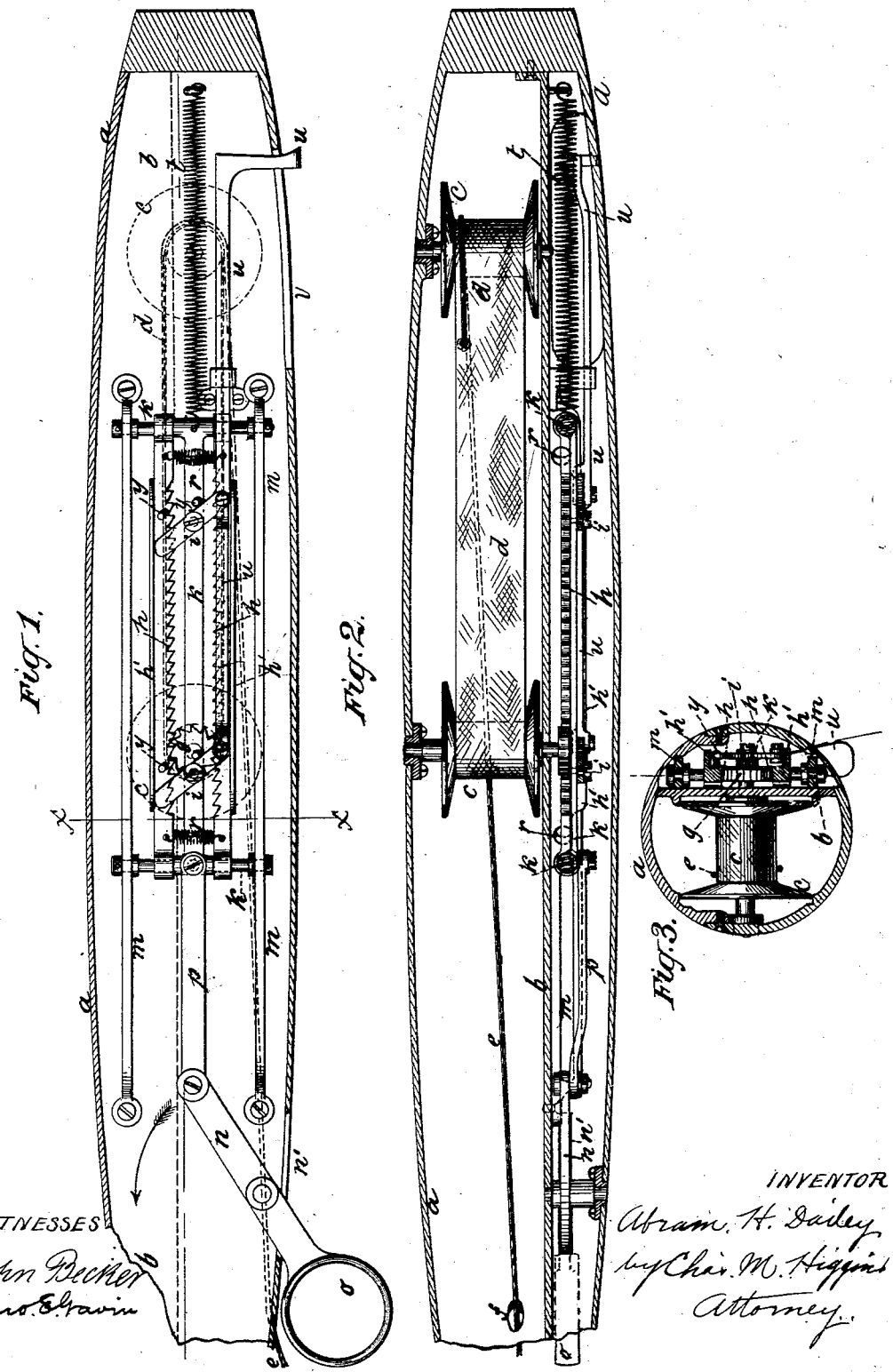

ABRAM H. DAILEY, OF BROOKLYN, NEW YORK.

FISH-LINE REEL.

SPECIFICATION forming part of Letters Patent No. 335,798, dated February 9, 1886.

Application filed February 20, 1885. Serial No. 156,580. (No model.)

*To all whom it may concern:*

Be it known that I, ABRAM H. DAILEY, of Brooklyn, Kings county, New York, have invented certain new and useful Improvements in Fish-Line Reels, of which the following is a specification.

My invention applies more especially to that type of reel shown in my former application, No. 151,272, filed December 26, 1884, in which the reel is inclosed within the butt of the pole; and it consists of two bobbins connected by an endless chain, to which the line is connected, so that the line becomes wound about both bobbins like a skein, the reel being operated within the butt by the manipulation of a digital reciprocating device on the exterior of the butt.

My present improvement lies chiefly in mechanism for imparting a continuous rotary motion to the reel by a reciprocating motion of the manipulating device, and also in means for throwing this mechanism out of gear to permit the reel to run free to let the line out. This mechanism consists, briefly, in the combination, with a ratchet-wheel on the reel, of two ratchet-bars having teeth of opposite inclination arranged to engage the ratchet-wheel between them, said bars being pressed against opposite sides of the wheel by springs, and connected to sliding cross-heads, which are mounted in longitudinal guides and connected to the reciprocating manipulating device, whereby the reciprocation of the manipulating device by the action of the finger will move the ratchet-racks back and forth, causing each rack to engage and slip alternately on opposite sides of the wheel, and thus impart a continuous rotary motion to the wheel. A sliding stop acting on toggle-links connected with the racks will enable the racks to be spread apart and out of engagement with the ratchet-wheel, thereby throwing the mechanism out of gear to let the reel run free when desired. My present invention therefore consists, mainly, in the features above outlined, as hereinafter fully set forth.

In the drawings annexed, Figure 1 is a longitudinal lateral section of the butt of a fishing-pole provided with my improved reel mechanism. Fig. 2 is a sectional plan thereof, and Fig. 3 a cross-section on line $x\ x$.

Referring to Figs. 1, 2, and 3, $a$ indicates the butt-section of the fishing-pole, which section preferably consists of a metal tube somewhat tapering or cigar-shaped toward the ends. Within this tube is secured a longitudinal partition-plate, $b$, on which most of the mechanism is supported, as best shown in Figs. 2 and 3.

$c\ c$ indicate the two drums or bobbins of the reel, which, as shown best in Fig. 2, are separated some distance from each other, and their spindles are journaled at one end in the side of the tube $a$, and at the opposite end in the plate $b$. The hubs of the drums are connected by a direct endless band or chain, $d$, suitably engaged, either frictionally or positively with the drums, so that when one drum is revolved the other will be forced to revolve in unison with it.

$e$ indicates the fish-line, which is guided along the pole in the usual way, and enters through an opening, $f$, near the upper end of the butt into the interior thereof, and is finally attached at the inner end to the band $d$, so that hence when the drums of the reel are revolved the line will be drawn by the band around both drums, and thus wound skein-like thereon, as will be readily understood.

This form of reel has important advantages, as set forth in my former application, and my present mechanism applies with great advantage to reels of this kind, but is not necessarily confined thereto.

Now, on the axle of one of the bobbins, preferably the forward one, is fixed a ratchet-wheel, $g$, which is embraced on each side by parallel ratchet racks or bars $h\ h$, the teeth of said racks being of course in relatively reverse directions to engage positively with the teeth on opposite sides of the ratchet-wheel, as best shown in Fig. 1. These rack-bars are carried on a sliding cross head or frame, $k$, having the shape of an extended ⊢⊣, the central bar of which is in line with the axis of $c$ the reels, while the end cross-bars are guided in longitudinal slotted guide-bars $m\ m$, affixed on the plate $b$, as well shown in Figs. 1, 2, and 3, so that the said frame or cross-head $k$, with its racks $h\ h$, is capable of sliding back and forth in the said guides and over the ratchet-wheel $g$.

The rack-bars h are capable of sliding in or out on the end cross-bars of the frame k, but are held together by spindles r at each end, which tend to keep the rack in constant engagement with the ratchet, as seen in Fig. 1.

Near the upper end of the butt is pivoted a finger-lever, n, in a slot, n', on the butt. One arm of said lever projects inward, and is connected by a link, p, with the sliding frame k, while the other arm projects through the slot n' on the exterior of the butt, and is terminated with a ring, o, in which the forefinger may be crooked to operate the same. A spring, t, affixed at one end to the frame k and at the other end to the butt, tends constantly to slide the frame back to its normal position, as shown, and produces the return movement of the mechanism.

It may now be seen that when a reciprocating movement is imparted to the lever n by the action of the finger and the reaction of the spring t, the sliding frame k will be slid back and forth in its guides, and the rack-bars h h will be moved against the ratchet-wheel g, so that in the forward motion the under rack, h, will engage the ratchet and revolve the ratchet in the direction indicated, and thus revolve the reel-drums in the direction to wind in the line, during which movement the upper rack will slip over the ratchet, whereas on the back movement the upper rack will engage the ratchet and continue the rotary motion in the same direction, while the lower ratchet will slip. In this way a rapid continuous rotary motion may be imparted to the reel by the simple reciprocation of the finger, as will be readily appreciated, thereby forming a very efficient device for operating the reel with the desired facility without much gearing.

Now, in order to throw the ratchet mechanism out of gear with the reel so as to allow the reel to run free to let the line run out, it is only necessary to slide the stop u forward. This stop u projects through a slot, v, in the base of the butt and connects to a sliding bar, u, within the butt, which bar u is in turn connected to two toggle-links, i i, which are pivoted at the middle on the central bar of the frame k, while each end of said links abut against lateral flanges h', which project from the rack-bars h, as best seen in Figs. 1 and 3. Normally the toggle-links i i assume an inclined position, as shown in Fig. 1, allowing the rack-bars to spring into engagement with the ratchet-wheel; but if the stop u is slid forward the links i i will be straightened, and the racks thus spread apart against the stress of their springs r r, and thereby thrown out of engagement with the ratchet-wheel, thus allowing the ratchet to revolve freely, and thereby allowing the reel to run free to let the line run out, as will be readily comprehended. Stop-pins y on the rack limit the motions of the links i and prevent them from being moved too far in either direction, as will be understood from Fig. 1. The spring t is of course very much stronger than the springs r r, so that when the stop u is moved to spread the racks h h against the stress of their springs r r, the said springs r r will yield readily without appreciably straining the spring t or moving the frame k and its racks forward.

I do not limit myself to the exact mechanism shown intervening between a stop on the exterior of the pole and the racks within for spreading said racks, as any equivalent devices may be used without departing from the principle of this part of my invention. Neither do I limit myself to the link p and lever n for reciprocating or operating the sliding rack-frame, as any equivalent devices may be used.

I am aware that mechanical movements have been made for changing reciprocating into rotary motion, which employ two oppositely-acting ratchet-racks engaging a ratchet-wheel between them, and made yielding by a spring to alternately slip on the ratchet; but such devices have not been combined and arranged with a reciprocating frame, k, and other features, as shown and claimed by me.

What I claim is—

1. The combination, with a reel and the ratchet g, of the oppositely-yielding rack-bars h h, engaging the ratchet, and the reciprocating frame k k, on which said racks are mounted, substantially as and for the purpose set forth.

2. The combination, with a reel and the ratchet g, of the rack-bars h h, engaging the ratchet on opposite sides, a reciprocating frame carrying said rack-bars, and a spreading device connected with said bars for spreading and disconnecting said bars from engagement with said ratchet, substantially as and for the purpose set forth.

3. The combination, with the hollow section of a fish-pole, of a reel inclosed therein, a ratchet, g, on said reel, two racks, h h, engaging said ratchet, a reciprocating frame, k, carrying said racks, with a digital reciprocating device on the exterior of the pole connected with said reciprocating frame, and a spring to produce the return motion of the frame, substantially as herein set forth.

4. The combination, with the reel c and ratchet g, of the reciprocating frame k, racks h h, and springs r r, arranged and operating substantially as and for the purpose set forth.

5. The combination, with a reel, of the ratchet g, racks h h, frame k, spring t, finger-lever n, and connection p.

6. The combination, with the reel c and the ratchet g, of the sliding frame k, with the racks h h and springs r r, and the spring t, with the lever n, connected to the frame k.

7. The combination, with a fish-pole having a hollow section, and a reel inclosed therein having a ratchet, g, with a sliding frame carrying rack-bars h h, engaging said ratchets, with a spreading device for spreading said rack-bars, and a manipulating stop connected with said spreading device and projecting on the exterior of said hollow section, substantially as herein set forth.

8. The combination, with the reel and its ratchet $g$, of the sliding rack-bars $h\ h$, toggle-links $i\ i$, and sliding stop-bar $u\ w$, substantially as shown and described.

9. The combination, with the reel $c$ and ratchet $g$, and the guides $m$ and frame $k$, of the racks $h\ h$ and springs $r\ r$, arranged and operating substantially as and for the purpose set forth.

10. The combination, with the reel $c$ and ratchet $g$, of the sliding frame $k$, a manipulating device for advancing the same, and spring $t$, for returning it, with the racks $h\ h$ and springs $r\ r$, links $i\ i$, and bar $u$, arranged and operating substantially as and for the purpose set forth.

ABRAM H. DAILEY.

Witnesses:
JNO. E. GAVIN,
CHAS. M. HIGGINS.